Feb. 20, 1968  J. M. ROLNICK  3,370,152
COVERED ELECTRODE WITH IMPROVED STARTING CHARACTERISTICS
Filed Dec. 31, 1964
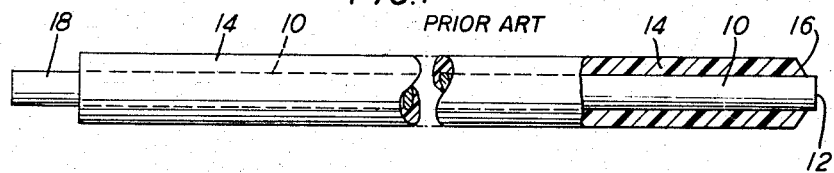
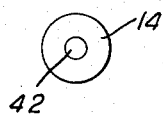
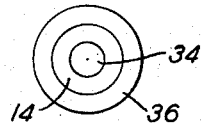
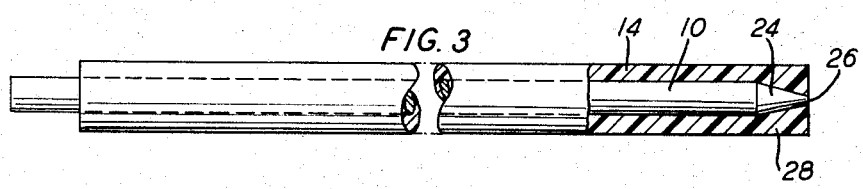
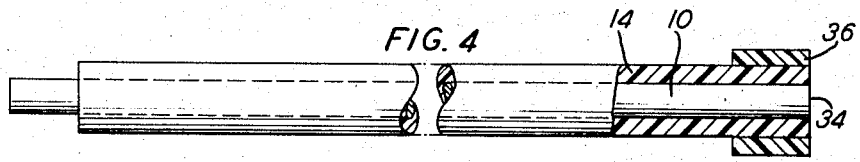
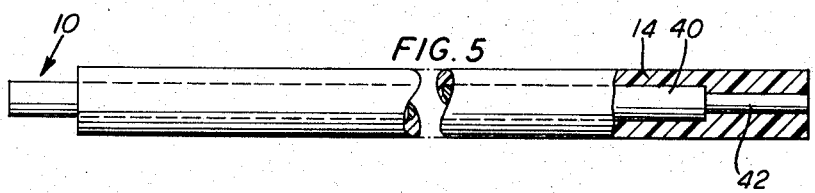
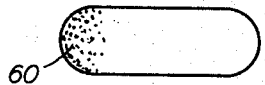
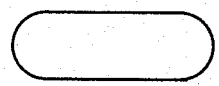
INVENTOR
JEROME M. ROLNICK
BY
Edmund W Bopp
AGENT

United States Patent Office 3,370,152
Patented Feb. 20, 1968

3,370,152
COVERED ELECTRODE WITH IMPROVED STARTING CHARACTERISTICS
Jerome M. Rolnick, Baltimore, Md., assignor to Air Reduction Company, Incorporated, New York, N.Y., a corporation of New York
Filed Dec. 31, 1964, Ser. No. 422,630
3 Claims. (Cl. 219—146)

ABSTRACT OF THE DISCLOSURE

In a low hydrogen type coated electrode, the core wire of otherwise uniform diameter is tapered at the arc-striking end at an included angle of less than 90 degrees, and preferably less than 45 degrees. The low hydrogen coating has an outside diameter of the coating over the tapered portion of the rod substantially the same as over the non-tapered portion. As a result the ratio of coating to core wire is maximum for arc starting and decreases as the electrode burns back to the point where the core wire is of constant diameter. This makes it possible to make pore free welds without rewelding over the start.

---

This invention relates to covered electrodes for use in electric arc welding, and more particularly to the proportioning of the relative thickness of the rod and the coating at the tip of the electrode where the welding arc is first struck.

The term "covered electrode" (also coated electrode) as used herein describes a filler-metal electrode, used in arc welding, consisting of a metal core wire with a relatively thick covering (coating) which provides protection for the molten metal from the atmosphere, improves the properties of the weld metal and stabilizes the arc.

The invention is especially applicable, although not exclusively so, to electrodes with coatings that are low in hydrogen content or substantially hydrogen-free, and particularly where the coating contains calcium carbonate ($CaCO_3$), and/or calcium fluoride ($CaF_2$) for generating shielding gas.

Welding with electrodes of the general class as above described is commonly employed in general fabrication and repair work. The electrode coating, among other functions, when heated generates the required shielding gas. The shielding gas protects the arc, the weld pool and the workpiece from deleterious effects of oxygen, nitrogen, water vapor, etc., in the atmosphere. It is particularly important that hydrogen, either from water vapor in the air or from any other source be prevented from becoming mixed with the molten weld metal and becoming entrapped therein when the weld solidifies. The result of such entrapped hydrogen or other gas is porosity in the finished weld which impairs the strength of the weld. The shield gas forming function of the electrode coating is relied upon in great measure to prevent any detectable porosity in the weld. Severe requirements regarding absence of porosity are commonly set which require that the finished weld be inspected by means of X-rays to discover possible voids.

It has been customary in electric arc welding with low hydrogen electrodes to employ a coated electrode in which the rod or core wire is of uniform diameter throughout its length and carries a coating of uniform thickness throughout the length of the electrode, except that half an inch or so of the electrode may be left bare at one end for making electrical contact with an electrode holder, and at the striking end the coating is trimmed back slightly so as to expose the butt end of the core for making contact between the core and the work in initially striking the arc.

In the usual coated welding electrode, the core wire burns faster than the coating, so that at the start with the conventional trimmed or untrimmed electrode tip the proportion of coating consumed to core consumed is much lower than the normal ratio which is established after the welding operation is under way. Therefore, at the start, none of the functions which the coating is designed to perform is adequately performed. In particular, the quantity of shielding gas generated from materials of the coating is insufficient at the start, with the result that the arc, molten weld pool and workpiece are inadequately shielded from the atmosphere.

An important result of the inadequate supply of coating at the start of a welding operation with a new electrode is the occurrence of porosity in the weld in its initial portion.

In accordance with the invention, the striking end portion of the electrode is modified to provide a higher ratio of coating thickness to core thickness over a significant portion of the length of the electrode as compared to the ratio of coating thickness to core thickness over the remainder of the working length of the electrode.

In one embodiment of the invention, the striking end of the core wire is tapered to a point and the coating is tapered in the opposite sense so that the overall diameter of the coated electrode is uniform throughout the working length of the electrode.

In another embodiment, the core and coating are of uniform thickness and an extra collar or ferrule of coating material is formed upon or slipped over and attached to the striking end of the electrode.

In still another embodiment, the striking end of the core wire is stepped down to a reduced diameter over a certain length within which the thickness of the coating is correspondingly increased so that the overall diameter of the coated electrode is again uniform throughout the working length of the electrode.

Other objects, features and advantages will appear from the following more detailed description of illustrative embodiments of the invention, which will now be given in conjunction with the accompanying drawings.

In the drawings,

FIG. 1 is a longitudinal sectional view of a prior art type of coated rod electrode;

FIG. 2 is a longitudinal sectional view of a coated electrode showing the general configuration which the coating and core assume when the welding operation is underway;

FIG. 3 is a longitudinal sectional view and FIG. 3A is an end view of one type of coated rod electrode in accordance with the invention;

FIG. 4 is a longitudinal sectional view and FIG. 4A is an end view of another type of coated rod electrode in accordance with the invention.

FIG. 5 is a longitudinal sectional view and FIG. 5A is an end view of still another type of coated electrode in accordance with the invention;

FIG. 6 is a diagrammatic representation of an X-ray negative of a weld bead, showing porosity at the start of the weld;

FIG. 7 is a diagrammatic representation of an X-ray negative of a weld bead, showing absence of porosity.

Referring to FIG. 1, 10 is the core rod or wire of a prior art type of coated rod electrode. The striking end or tip of the core is shown at 12. The coating is designated 14 and is stripped back slightly from the end 12 as shown at 16. It will be evident from the figure that when the arc is first struck there is little or no coating material in position to be melted, while the core wire is full diameter and bare. The end 18 of the core remote from the striking end is usually left bare for gripping the electrode with an electrode holder which makes electrical contact with the electrode core at that end.

FIG. 2 shows the usual configuration of the core and coating after the weld is underway. The core has burned faster than the coating, leaving a hollow cup-shaped cavity 20 extending toward a workpiece 30 from the tip 22 of the core. The sides of the cavity 20 preesnt a relatively large area of coating material for melting into an arc 32 compared to the smaller area of the core tip 22. It is usual to design the relative thicknesses of core and coating so that in a working condition such as that shown in FIG. 2 a satisfactory ratio of supply of coating to core is obtained. It will be evident that the desired ratio as illustrated by FIG. 2 is far from being available at the start in the use of the type of coated electrode shown in FIG. 1.

FIG. 3 shows one type of coated electrode in accordance with the invention. The striking end of the core 10 is tapered as shown at 24, coming to a point 26, preferably blunted as shown, which is exposed at the striking end to permit the core to touch the workpiece for striking the arc. The coating becomes thicker at the approach to the striking end of the electrode as shown at 28. In the example shown in FIG. 3 the outside diameter of the coating remains the same throughout the working length of the electrode, so that the coating is tapered at the striking end with a taper that is the reverse of that of the core. However, the overall diameter of core and coating need not be uniform but may vary to give any desired degree of taper to the core and to the coating. I have found that best results are obtained with the included angle of the tapered core somewhat less than 90 degrees. For a conical taper, the included angle is the angle between the sides of a longitudinal section of the core, which sides meet at the apex. In this case it is satisfactory to make the outer diameter of the coating uniform for greater ease of manufacture.

With an included angle of 90 degrees or more, weld beads when examined with X-ray showed a pattern of porosity over an initial portion of the weld beginning with the striking of the arc. With included angles of 45 degrees or less, X-ray examination showed no porosity over any portion of the length of the weld. FIG. 6 shows diagrammatically the general appearance of the X-ray negative taken through a completed weld made with a prior art electrode of the type illustrated in FIG. 1. The porosity at the start of the weld is shown by small dark spots in the region 60. FIG. 7 shows the absence of such spots in the case of an otherwise similar electrode having an included angle of taper of 45 degrees or less. In this particular instance the electrode was an Airco E–7018 electrode. The outside diameter of the coating is 0.170 inch, the outside diameter of the core being 0.094 inch (3⁄32). For this electrode, the coating per unit length is about 38 percent by weight of the entire electrode per unit length and the core about 62 percent by weight.

In general, starting with any coated electrode having a given ratio of outside diameters of coating and core that is known to give good performance in welding once the core and coating have burned away sufficiently to set up a steady state condition, the optimum included angle of the tip portion 24 of the tapered core may be found by experiment. When the optimum angle has been found, duplicate electrodes of the optimum dimensions can be made with assurance of optimum performance.

FIG. 4 shows another type of coated rod electrode in accordance with the invention. In this type, the core is of uniform diameter throughout its length and it has a butt end 34 flush with the end of the coating at the striking end of the electrode. The end 34 is thus in a position to be touched to the workpiece in the initial striking of the arc. To provide the extra amount of coating material to ensure adequate functioning of the coating material at the start of the weld, a collar or ferrule 36 of coating material is provided which may be slipped over the striking end of the electrode after the forming or extrusion of the electrode of which may be formed integrally with the main body of the coating. If the separate collar or ferrule is used, it may be shrunk-fit upon the coating 14 or otherwise fastened thereto in assembling the electrode.

Starting with a coated electrode having a given ratio of outside diameters of coating and core that is known to give good performance in welding once the core and coating have burned away sufficiently to set up a steady state condition, and starting with a collar 36 of given thickness, the optimum length of the collar 36 can be determined by experiment. Alternatively, starting with a collar 36 of given length, the optimum thickness of the collar 36 can be determined. In either case, duplicate electrodes of the optimum dimensions can be produced with assurance of optimum performance.

FIG. 5 shows still another type of coated electrode according to the invention. In this form, the coating 14 is of uniform outside diameter throughout its length and the main portion 40 of the core is of uniform outside diameter. The striking end of the core as shown at 42 is of stepped down diameter as compared to the main portion 40, thus providing an extra proportion of coating over a region of the striking end of the electrode.

Starting with a coated electrode having a given ratio of outside diameters of coating and core that is known to give good performance in welding once the core and coating have burned away sufficiently to set up a steady state condition, and starting with a given step-down ratio of the diameters of the portions 40 and 42, the optimum length of the reduced diameter portion 42 can be determined by experiment. Once this length is found, duplicate electrodes can be produced with assurance that each electrode will give satisfactory welding, substantially free of porosity, beginning immediately at the striking of the arc.

It has been found that with electrodes embodying the invention it is easier to maintain the electric arc at the start than with prior art electrodes. The reason for this appears to lie in the fact that ionizing materials which are usually incorporated in the electrode coating, materials such as calcium oxide ($CaO$), potassium oxide ($K_2O$), etc., are introduced into the arc at the start more quickly and in greater quantity than with prior art electrodes.

The optimum proportioning of coating and core at the tip of the electrode may depend to some extent upon the material of the core, whether iron, stainless steel, aluminum, etc., and in the case of stainless steel, for example, it may depend upon whether the arc carries direct or alternating current. In any case, the optimum configuration can be found by tests of the type described herein.

The ratio of coating material to core material may be variously expressed as cross-sectional area of coating to cross-sectional area of core, outside diameter of coating to outside diameter of core, percent by weight of coating per unit length of electrode compared with the weight per unit length of the entire electrode, comprising core plus coating, etc.

While illustrative forms of apparatus and methods in accordance with the invention have been described and shown herein, it will be understood that numerous changes may be made without departing from the general principles and scope of the invention.

What is claimed is:
1. In an arc welding covered electrode of the low hydrogen type consisting of a metal core wire with a relatively thick substantially hydrogen free covering containing a shield gas forming constituent selected from the group consisting of calcium carbonate and calcium fluoride, the improvement which comprises providing a conical taper on the arc starting end of the core wire having an included angle at the apex of not more than 90 degrees and providing coating over the tapered portion in an amount to maintain the outside diameter of the coated portion of the electrode uniform throughout its length.

2. An electrode in accordance with claim 1, in which the said included angle is not more than 45 degrees.

3. In the method of welding with a low hydrogen type of coated electrode, which method comprises the steps of striking the arc by touching the core of the electrode to the workpiece and thereafter advancing the arc along the path of the weld, the improvement which comprises continuously varying the ratio of coating material to core material supplied to the arc at the start of the weld from substantially all coating material to about 38% coating material by weight as the electrode burns back a length equal to at least one-half the core-wire diameter, to thereby eliminate the formation of pores in the weld at the start of the weld.

References Cited

UNITED STATES PATENTS

| | | | |
|---|---|---|---|
| 1,354,476 | 10/1920 | Fay | 219—146 |
| 1,559,875 | 11/1925 | Holsag | 117—203 |
| 2,123,571 | 7/1938 | Lessel | 117—204 |
| 2,370,100 | 2/1945 | White | 219—146 |

FOREIGN PATENTS

| | | |
|---|---|---|
| 497,133 | 12/1938 | Great Britain. |
| 152,733 | 10/1920 | Great Britain. |

RICHARD M. WOOD, *Primary Examiner.*

W. D. BROOKS, *Assistant Examiner.*